May 29, 1928. 1,671,914
W. B. WESCOTT
PROCESS OF MAKING REENFORCED RUBBER ARTICLES
Filed Nov. 25, 1925
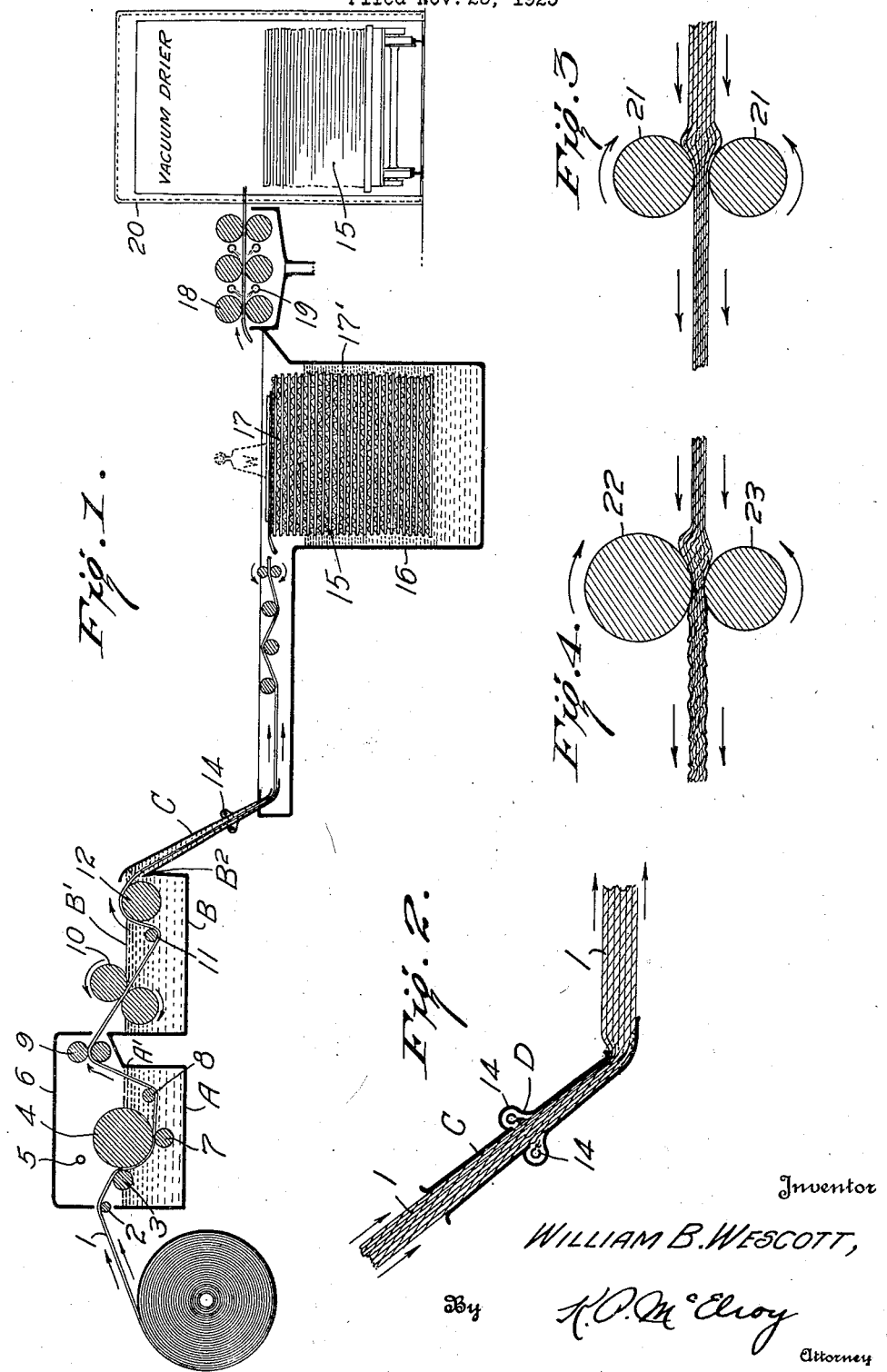
Inventor
WILLIAM B. WESCOTT,
By K. P. McElroy
Attorney Patented May 29, 1928.

1,671,914

UNITED STATES PATENT OFFICE.

WILLIAM BURTON WESCOTT, OF DOVER, MASSACHUSETTS, ASSIGNOR TO RUBBER LATEX RESEARCH CORPORATION, OF BOSTON, MASSACHUSETTS, A CORPORATION OF MASSACHUSETTS.

PROCESS OF MAKING REENFORCED RUBBER ARTICLES.

Application filed November 25, 1925. Serial No. 71,405.

This invention relates to a process of making reenforced rubber articles, and it comprises a process wherein a loosely arranged aggregate of relatively long fiber, such as a fabric, felt, bat or yarn is saturated with latex, such latex being usually purified and being sometimes concentrated and being sometimes in a state of incipient coagulation, the latex on the surface of the body so formed is coagulated to form an enclosing seal or membrane, further latex being then usually interiorly injected, (preferably by hydrostatic pressure), the contained latex is then solidified, usually by acid coagulation, the article is submitted to alternate compressions and decompressions in the presence of water to wash it, with the last decompression in the absence of water, is then dried in vacuo to a water content less than that normal to the contained fiber and is then submitted to a compacting pressure, advantageously while hot and is often further modified under pressure to change the direction of the fiber and increase the extensibility and is often finally vulcanized; all as more fully hereinafter set forth and as claimed.

Latex is the milky sap of caoutchouc producing plants; mainly Hevea. It is the source of commercial raw rubber which is produced by coagulating the latex with acetic acid, etc. Coagulation extends from centers or nuclei and produces a material of a veined or reticulate structure. As the raw rubber is difficult to wash, it is customary to dilute the latex somewhat prior to coagulation to leave as much as possible of the solubles in the coagulation mother liquor. Ordinarily the coagulum is washed somewhat between rolls, sheeted and sent into commerce as crepe or plantation sheet. From the mode of preparation, it is not a particularly pure material and contains impurities which are responsible for much of the darkening and deterioration with age.

In latex the caoutchouc, or the substance which becomes caoutchouc on coagulation, exists in the form of extremely fine particles in suspension in a watery liquid; the suspension being so fine that the liquid to a large extent has the properties of a true solution. It passes freely through paper and is taken up by capillaries. By the action of acids and many other chemicals, the dispersed particles coalesce, coalescence taking place as stated from nuclei and the outcome is coagulated rubber. Coagulation requires time and there are however many stages between the initial fine dispersion and the final separated coagulum. For commercial purposes, latex may be kept in its original state, or nearly its original state, by the addition of ammonia or other alkaline bodies. In the latex, the caoutchouc is a colloid. Since the latex condition cannot be regained from the coagulum, it is an irreversible colloid.

If latex be dried, a gel is obtained differing somewhat in its properties from coagulation rubber. Mechanically, gel rubber in its properties is somewhat like long milled rubber.

In the present art, there has been considerable activity in the use of latex for impregnating fibers and fibrous bodies, since, because of its entering capillaries, it is possible to employ it to carry rubber into the interior of fibers; something which is not practicable with the ordinary types of "dissolved" rubber or rubber cements. Rubber brought into a liquid state by carbon bisulfid, etc., will not enter capillaries; it can only be used for surfacing.

There is a limit, however, to the amount of rubber latex which can be introduced by capillary absorption only and there are certain disadvantages in the product. It is a purpose of the present invention to overcome this limitation and avoid these disadvantages, attaining certain new advantages. Commercial latex preserved with ammonia carries around 30 per cent of rubber. Cloth, cords, thread and the like will take up and hold by capillarity somewhere between 100 and 200 per cent of latex, which, on a dry basis, means a final article containing between 23 and 37 per cent rubber. In other words, fabric soaked in latex will take up only that per cent of rubber. But a treated fabric or cord containing more than half its weight of textile fiber has the properties of a textile article rather than a rubber article; it is cemented fiber and not reenforced rubber. As a matter of fact, an impregnated cord containing 23 to 37 per cent rubber is less extensible and is stiffer than the original unimpregnated cord; this being because the fibers are cemented together by rubber films too thin to permit the normal play of fiber over fiber. Stagewise impregnation to get more rubber in is not practical.

The present invention produces, in contradistinction to this current art, a reenforced rubber; a material carrying relatively long fiber in amount less than that of the rubber. The rubber or rubber composition is more than 50 per cent and is usually in excess of 65 per cent. This material is produced by distributing fiber in the right amount in a body of latex (instead of latex in a body of fiber) and then coagulating. The reenforced rubber so produced is washed to free it of traces of the coagulant which may have been used and to eliminate such soluble non-rubber constituents of latex as may be present, thereby minimizing the tendency to deteriorate in the presence of air particularly while hot. Not only is an unwashed product, as derived from normal whole latex, darkened in color by exposure to air while hot but the rubber becomes tacky in time and loses the tough, gristly character so highly desirable in an unvulcanized raw rubber product.

In producing materials under the present invention, it is advantageous to purify the latex preliminarily to get rid of as much of the non-rubber solutes, and particularly proteids, as possible. It is one of the advantages of the present process as hereinafter described, that thorough and exhaustive washing of the final product is also practicable. The invention comprises various successive stages of operation, together leading to a common result, viz, efficient impregnation, and severally useful.

While, as stated, latex enters fibers by capillarity, in dry air-bound fibers, its flow is often relatively slow and irregular. In assembling fibre and latex I have therefore found it desirable to facilitate this entrance by first expelling the air in the fiber; which may be done by soaking, wetting or steaming. Either latex or water may be used in preliminarily expelling air. It is found in practice that if there be air bubbles left on or among the fibers, there will later be bad spots in the finished material. Instead of using either water or latex for the preliminary expulsion of air, I sometimes find it of advantage to use a weak solution of acid, say, a 10 per cent solution of acetic acid. In so doing, acid is adsorbed on the fibers and remains during the subsequent latex treatment. When all the rubber is later to be solidified by coagulation, this adsorbed acid quickens the final coagulating operation materially. Sometimes I moisten by wet steam. The steam atmosphere may contain a little acid vapor, acetic or formic acid for example. Effective wetting is more easily secured with hot water than with cold. Sometimes it is convenient to use steam. Latex may be used in wetting. However produced the wet article is wrung in any suitable way to expel excess moisture and is then permitted to expand in a bath of latex. The latex is taken up uniformly and quickly. No time is afforded in this expansion for coagulation or such a degree of coalescence as would impede penetration.

In the invention as so far stated the product is cord or other material saturated with latex; the amount of latex being, of course, that which the fibers or fibrous article will hold when so expanded.

If the cord be removed and allowed to drip, the amount of latex retained will be somewhere between 100 and 200 per cent corresponding respectively, with a 30 per cent latex, to 30 parts rubber and 60 parts rubber for 100 parts fiber. The amount which can be retained where dripping is permitted may be increased to some extent by concentrating the latex; but there is a limit to this. Where as little as 50 per cent rubber is desired it is possible so to introduce enough concentrated latex to yield such an amount of rubber, but it is not possible to handle the saturated article produced thus far in further operations without resorting to various special expedients.

The amount of latex which can be associated with fiber may be increased in various ways. One simple way, which I have heretofore used (Application No. 703,782 filed April 2, 1924) is to place an open textured bat in a shallow pan containing the desired amount of latex and solidify, usually by coagulation. As coagulation proceeds from nuclei or centers, and these are afforded by the fiber the final result is a molded or shaped sheet having the general shape of the pan but of less dimensions and having the desired rubber fiber ratio. This, however, is a batch process and not readily applicable to large scale working. A better way for continuous operation and one coming under the present invention is to saturate an open textured material which may be cord, yarn, fabric or batted material, that is material with fiber in random arrangement or in ordered arrangement with such latex as it will hold and skin coat the body of latex and fiber thus produced by surface coagulation, sealing in the residual uncoagulated latex. This skin coating can be almost instantaneously done by a contact with a bath of acid or other suitable chemical. A 20 or 30 per cent solution of acetic acid is suitable. The acid may or may not be hot. A better coating is produced if the operation is such as to burnish or compress the surface film somewhat at the time of formation. In treating sheets, cords and the like, it is practicable to pass the latex carrying article through an acid bath by mechanical means. Any puncture which may occur in the skin heals at once.

As transfer from a latex bath to an acid skin coating bath may be effected without appreciable loss by dripping, it has been found by experience that with certain fiber arrangements resulting in firm open texture, enough latex can be carried over with the fiber into the acid bath to yield on solidification a 50 per cent rubber content; the excess of latex over that which would normally be held by capillarity being retained during the solidification operation by the skin coating first formed. Where more rubber than 50% is desired, as is usually the case, additional latex can be introduced after production of the skin coating; more latex being simply injected into the interior of the coated article under some pressure. A convenient way of effecting this injection is to run a body of fiber continuously from the latex bath into and through a bath of acid at a lower level; passage from one bath to the other being through some sort of nozzle or die. This nozzle or die not only serves in preventing back flow of acid into the latex bath but performs another important function in that it compresses the open textured reticulate skin coating as it is formed and thus aids in yielding a fluid tight membrane. As the article encounters the acid bath, it skin coats and the hydraulic pressure of latex behind it forces more latex into the interior. The amount so introduced or the distension produced is automatically limited by the length and disposition of the included fibers. With loose woven or loose twisted material it is therefore practicable to introduce more latex in this way than with close woven or closer twisted material. Distension can go further. At this stage in the operation, the material carries a skin coating of coagulated rubber and contains uncoagulated latex interiorly.

In one modification of my invention, the material at this point is removed from the acid bath, slightly washed and is then dried to produce an article having coagulation rubber at the surface and gelled rubber inside. Gelled rubber which has general characteristics like those of plasticized or milled rubber, is sometimes desirable when the product is to be later vulcanized. Drying is best effected under vacuum at about 150° F. The result after drying is a spongy honeycombed article. If it is desired in this form, that is, spongy, it is best cooled under vacuum; and particularly where the latex has not been previously purified. Any long contact of hot spongy rubber with air is apt to result in deterioration. When compacted articles are desired the hot spongy material coming from the drier is immediately compressed to weld the rubber together. Compression may be done between rollers. If the compacted material be passed through rollers having a differential motion, certain useful advantages are produced in the texture of sheets.

Generally, however, I produce an article in which the rubber in the interior as well as on the exterior is coagulated. In so doing the material having a skin coat of rubber is allowed to remain in contact with acid until the interior latex is coagulated. This operation is hastened if there is a little acid on the fiber coming from the first wetting treatment. In using for the fiber, stitched bodies, it is found that there is enough penetration of acid along the stitching to materially hasten coagulation. Generally, I simply allow the coated article to remain in the acid bath used for skin coating for a time sufficient to produce coagulation throughout. Interior coagulation can be hastened by manipulating the material so as to stir or agitate the interior. Satisfactory agitation can be effectively produced by festooning the material about pulleys or rolls within the acid bath. In handling sheet material it is sometimes desirable to cut a continuous web of material going through the latex bath into shorter sheets in the acid bath, using an acid wet knife. The cut edges heal instantly. The sheets may be superimposed in the acid bath and the top sheet weighted down. The sheets are ordinarily lighter than the acid and float. I can lessen the tendency to float by an addition to the latex of suitable heavy inert material in sufficient amount. In light colored goods a filler of the nature of zinc oxid will serve. The advantage of such an adjustment of specific gravity is that the fluid latex contained in the skin coated bag is then in approximate hydrostatic balance with the surrounding acid bath, and consequently there is no objectionable displacement of the latex causing a loss of shape, and the resulting rubber is in substantially uniform distribution. If the material be cut into lengths in the acid bath and stacked therein to remain until coagulation is completed such an adjustment of gravity is desirable.

It is practicable to incorporate various fine solid materials for other purposes in the latex bath as a suspension. Where fillers or colors are required in the final article it is convenient to add them in this manner. Articles made from purified latex under the present invention are light colored and the addition of coloring material or dyes in the latex bath to give final materials of good color is therefore practicable. Sulfur to serve in subsequent vulcanization can also be added to the latex. In any event, it is a desirable expedient to add a little sodium sulfid to the latex bath; usually not in amounts over 0.2 or 0.3 per cent. Sometimes I incorporate relatively large amounts of rubber from other sources, reduced to fine dust-like comminution, in the latex bath.

Various rubber substitutes can be emulsified in the bath. Rubber and rubber substitutes are, of course, used where the finer material is to be a reenforced rubber composition rather than reenforced pure rubber.

As so far described, after the coagulation treatment, the material is a wet distended bag-like article containing water (or latex serum) within it. If it be passed through rolls at a certain speed, usually not less than 6 feet per minute, the coating ruptures and much of the water can be expressed and the resulting wet sponge passing the rolls will re-expand. If the material is allowed to pause, however, in going through the rolls, there will be a dense spot where welding takes place. The facts just stated make convenient a thorough washing to get rid of latex serum and traces of acid; thereby allowing the operator to produce a material which will not discolor, become tacky, or oxidize with age, as often happens with materials impregnated with latex by prior art methods. In so washing, the article is passed through a succession of rolls, being allowed to expand under a spray of water after passing each roll. After the final compression roller no water spray is used.

As so far described, the product is a moist, spongy mass of fiber and rubber in intimate association; a body of rubber containing distributed fiber. The rubber, of course, permeates the fibers as well, but the material as a whole is a body of rubber. Because of the spongy structure and the extreme thinness of the filaments and films of rubber, however, the structure is easily washed in the manner just described and can also be quickly and readily dried. If it be exposed to a dry atmosphere at a low temperature, or, which is better, handled in a vacuum drier at a low temperature, the moisture remaining in the material may be reduced to a point less than that required by the "water of condition" of the contained fiber. I advantageously dry to this extent; so as to have a sub-atmospheric moisture content in the contained fiber. By drying to this extent, I have found that the warm dry rubber-fiber article when run through rolls readily becomes dense by the welding of rubber to rubber. In practice this gives me an article of very great mechanical strength and of rather interesting properties as regards tensile strength. As good an article is not obtained if the moisture content left in the fiber be equal to, or greater than, that natural to the same fiber when exposed to air. The rubber does not give as firm a union with the fiber.

The general method as outlined ante lends itself to a number of specific embodiments in making reenforced rubber articles of novel type and of great utility in diverse arts, among them being composite sheeting adapted for making shoe soles and composite cords for tire making. In making all these novel articles, the general process outlined is followed. In nearly all cases, the rubber of the reenforced article is coagulation rubber; but sometimes I make articles which are, as mentioned ante, partly coagulated rubber and partly gelled rubber. In making sheeted material containing reenforcing fiber or fabric, material of useful and novel properties can be obtained by passing the final dried and compressed rubber material between rolls of different size or rolls having a differential speed. In so doing, there is a sort of chattering which tends to bank up the rubber in transverse layers; giving a sort of an accordion plaiting structure throughout the article. The result is not merely a superficial corrugation; it is an internal structure extending through the cross section, in which the fibers are so crumpled as to greatly increase the extensibility in the direction in which they are crumpled.

Cords, thread and ribbon prepared in the manner described ante are particularly useful for automobile tire fabrics. It is a desideratum in the art to get a better bond between adjacent parallel cords and between the fibers of the cord, and to give a bonding medium for "friction" coats of rubber. While the use of latex has been proposed for impregnating cords to be used in this way, difficulties have arisen because of the small amount of rubber which can be brought within the cord by simple soaking operations, the smallness in amount limiting the play of fiber over fiber in the cord. It is upon this play that the flexibility of the cord and its practical utility in the tire depend. In the effort to obviate this stiffness, and for the sake of economy as well, special cords are sometimes made with less twist, making them less dense than is customary in ordinary tire work; but, even so, the results have not been satisfactory. In cord-like materials made under the present invention the body of the product is rubber and the fiber is present as reenforcement. I find that really good and satisfactory material having substantial extensibility must have this character. It cannot be made with less than 50 per cent of rubber in the final article. Possibly, 65 per cent is a safer lower limit. I have found that in practice I usually use about 75 per cent.

Fig. 1 is a schematic longitudinal cross-sectional view of an apparatus for practicing the method herein described;

Fig. 2 is an enlarged view, in cross section of a die-nozzle employed in the apparatus;

Fig. 3 is a cross-sectional view of a pair of rollers employed for distorting the stock prepared in the apparatus shown in Fig. 1; and, Fig. 4 is a cross-sectional view similar to Fig. 3, showing the stock as it appears when treated by another pair of rollers.

A cord, yarn, sheet or other fibrous material 1, enters from the left passing over a guide roll 2 and between the squeeze rolls 3 and 4, whose meeting point is at the level A' of the liquid in the tank A. This bath may be hot water, acidulated water or latex. Steam pipe 5 permits introduction of steam. Hood 6 maintains a confined atmosphere. The material passing between the rolls 3 and 4 has much of its contained air driven out by the compression and it expands under the surface of the bath in A, becoming saturated with water. Submerged roll 7 aids in expelling air. Material then passes around guide roll 8; thence it goes out of the bath and through the wringer rolls 9 where it is subjected to heavy pressure to remove the excess of liquid. The expressed liquid drains back into tank A. The wet material passes down between squeeze rolls 10, which are so situated that their meeting point or "pinch" lies at or just below the surface B' of the latex in the latex tank B. Air is expelled and the material expands in the latex bath. This latex may be, and advantageously is, latex purified by removing non-rubber solubles and especially proteids. This may be effected by washing the latex in a centrifugal separator as described in my application Serial No. 40,118, filed June 27, 1925. The latex bath may contain in suspension such fillers or materials as are desired in the final composition, such as carbon black, zinc oxid, whiting, etc. Quite substantial amounts of rubber substitutes and additions, such as gilsonite, boiled oil, etc. may be incorporated into the latex.

The web or sheet next passes under a guide roll 11 below the surface B' enabling latex to enter from all sides as the web expands. It is now passed over the roll 12 and delivered into chute C, passing over the dam B², the upper edge of which is just enough below the normal latex level to permit the expanded saturated article to be carried into the chute C by the roll 12 as stated without losing latex. The chute C is full of latex and tapers downwardly towards an acid spray 14 near its lower end. The walls of the chute C are so positioned as to just permit the passage, without compression, of the fully saturated web into the larger acid spray chamber D (see Fig. 2). Here a spin of coagulation rubber is formed almost instantly. Within this skin the hydrostatic head in C forces more latex, expanding the sheet or cord. Beyond the spray chamber the walls of the chute C are shown as converging slightly, just enough to compress the skin coating, while coagulation is still in progress, to seal the pores in the reticulate structure and yield a fluid tight membrane.

Generally I continue the exposure of the material to the action of acid for a sufficient length of time to permit coagulation throughout. To save space during interior coagulation the material may be festooned in the acid bath or passed therethrough in a tortuous path by suitable rolls. Either, by alternate concaving and convexing of the rubber side walls, quickens the action. I have however here shown the sheet coming from C as cut into lengths. The sheets may be 6 feet by 3, and of a thickness (at this time) of 0.25 to 1.5 inch in making tread stock for shoe soles. The sheets 15 I have shown stacked in acid well 16. Weight W may be used to keep the stack submerged. In order to facilitate penetration of the acid it is advantageous to interpose between the sheets permeable separating septa 17' which may be aluminum netting or heavy open weave canvas or fabric.

The sheets after a sufficient time of pickling pass between a series of expressing rolls 18. Three sets are shown but more may be used. In a sheet going through the first pair, the surface coat is ruptured and the expressed acid liquid drains back. Spray 19 beyond resaturates the expanding sheet with water. Expression and rewetting are repeated by the next pair. There is no spray beyond the final rolls, expansion being in air.

The final compression and re-expansion gives at this point an open porous textured moist rubber article which can be readily dried. While drying is practicable in other ways, the best results are obtained by drying under as great a vacuum as practicable. The drying shelves may be at a temperature of 150° F. with advantage. Drying is advantageously carried to a point where the contained moisture is less than that normal to the contained fiber under ordinary atmospheric conditions. Under the conditions of drying stated the open texture of the material is maintained. If the honeycomb structure is to be retained in the finished article, it is advantageous after drying to cool while still under vacuum. I have found it disadvantageous to allow any exposure of this honeycomb-like material to air still hot for any substantial time. Where a compacted final material is to be made, however, the warm material is taken directly from the vacuum chamber 20 and passed through compacting rolls 21. On so passing the rubber surfaces weld together to give an integral rubber article containing distributed fiber. The better the drying, the better is the cohesion between the rubber and the fiber. A honeycomb structure cooled in vacuum as described may be compressed when cold into an integral structure; but heavier pressure is requisite than where rubber welding is done hot.

For many articles, and particularly for tread stock of the character of the material described and claimed in my copending application No. 65,439, filed October 28, 1925, it is desirable to pass the sheeted material thus compacted through a pair of cooled rolls 22—23 of differential speed thereby giving a differential flexibility and extensibility in different directions.

The material thus producd as thus far described is an integral body of coagulation rubber containing reenforcing fiber; the amount of this fiber, however, being less than 50 per cent of the whole. If the latex employed was without additions, the rubber component is pure rubber. However, as stated, various fillers and compounding agents may be employd in conjunction with the latex; and in this event the body of the article will, of course, be a rubber composition. As before, however, the amount of fiber should be less than 50 per cent of the total. The material at this time is uncured. If it be desired to cure it, this may be done by any of the ordinary vulcanizing methods. It being impracticable to add solid sulfur to the article after making as described, the sulfur in the event that vulcanization is wanted, should be added to the latex. However, it is possible to effect some degree of vulcanization by the treatment of the spongy material after drying but before compression with liquids or gases containing or yielding sulfur. I, however, regard it as most practicable to add flowers of sulfur or other finely divided sulfur to the latex bath. As the sulfur is commonly somewhat acid, it is desirable that the bath be made somewhat more alkaline where this addition is made. The additional alkalinity can well be given by an addition of sodium sulfid.

In the material made under the present invention the presence of long fiber enables thorough washing and purification, partly because of the strength and character it gives the rubber containing it and partly because it maintains the open honeycomb structure during the alternating compressions and decompressions in the presence of water. In washing in lieu of using the particular rolls and sprays shown, rolls submerged in a moving body of water may be used.

The process herein described is also applicable to the manufacture of cords or the like, as more fully set forth in my copending application, Serial No. 96,092, filed March 19, 1926.

What I claim is:—

1. In the manufacture of fiber reenforced articles of rubber or rubber composition, the process which comprises saturating a body of fiber with latex, forming a skin coating of solid rubber on the article and solidifying the latex rubber within the article.

2. In the manufacture of fiber reenforced articles of rubber or rubber composition, the process which comprises saturating a body of fiber with latex, forming a skin coating of solid rubber on the article, injecting more latex into the article and solidifying the latex rubber within the article.

3. In the manufacture of fiber reenforced articles of rubber or rubber composition, the process which comprises saturating a fibrous body with latex, forming a skin coating of solid rubber on the article, solidifying the latex rubber within the article, washing the article, drying to remove contained water and compressing the article into a compact mass.

4. In the manufacture of fiber reenforced articles of rubber or rubber composition, according to the process of claim 1, the operation which comprises compressing and reexpanding the fibrous material within the latex to thoroughly saturate the article with latex.

5. In the manufacture of fiber reenforced articles of rubber or rubber composition, according to the process of claim 1, the operation which comprises hot wetting the fibrous body prior to saturating with latex.

6. In the manufacture of fiber reenforced articles of rubber or rubber composition, according to the process of claim 1, the operation which comprises wetting the fibrous body in the presence of acid prior to saturating with latex.

7. In the manufacture of fiber reenforced articles of rubber or rubber composition, according to the process of claim 1, the operation which comprises hot wetting the fibrous body and removing the excess of moisture by compressing the wet fibrous material prior to saturating with latex.

8. In the manufacture of fiber reenforced articles of rubber or rubber composition, by the process of claim 1, the operation which comprises forming a skin coating of solid rubber on a fibrous body saturated with latex by treatment with an acid and compressing the skin coating by passage through an orifice.

9. In the manufacture of fiber reenforced articles of rubber or rubber composition, the process which comprises saturating a body of fiber with latex, forming a skin coating of solid rubber on the article by the action of acid and solidifying the latex rubber within the article by a continuation of the contact with acid.

10. In the manufacture of fiber reenforced sheets of rubber or rubber composition, the process which comprises saturating a fibrous web with latex, forming a skin coating of solid rubber on the web, cutting into sheets and solidifying the latex rubber within the sheets while superimposed in a floating stack in an acid bath.

11. In the manufacture of fiber reenforced articles of rubber or rubber composition, the process which comprises saturating a body of fiber with latex, forming a skin coating of solid rubber on the article, solidifying the latex rubber within the article, drying to remove contained water while the article is open textured and vulcanizing.

12. In the manufacture of fiber reenforced articles of rubber or rubber composition, according to the process of claim 1, the operation which comprises saturating the article with latex, forming a skin coating of solid rubber on the article, solidifying the latex rubber within the article and washing the article by alternate compression and re-expansion in the presence of water.

13. In the manufacture of fiber reenforced articles of rubber or rubber composition, the process which comprises saturating a body of fiber with latex, forming a skin coating of solid rubber on the article, solidifying the latex rubber within the article, drying to remove contained water, compressing and crumpling the fibers in one direction.

14. In the manufacture of fiber reenforced articles of rubber or rubber composition, the process which comprises saturating a body of fiber with latex, forming a skin coating of solid rubber on the article, solidifying the latex rubber within the article, washing the article, drying to remove contained water, compressing the article into a compact mass and crumpling the fibers in one direction while cold.

15. The process of making composite rubber-fiber articles which comprises passing fibrous material through a latex bath and into a communicating acid bath at a lower level to produce a coating and a distension by hydrostatic pressure of latex.

16. The process of making composite rubber-fiber articles which comprises passing fibrous material through a latex bath into an acid bath at a lower level to produce impregnation, skin coating and distension, allowing contained latex to coagulate, compressing the article to remove contained liquid and washing to remove latex non-rubber solids.

17. The process of making composite rubber-fiber articles which comprises passing fibrous material through a latex bath into an acid bath at a lower level to produce impregnation, skin coating and distension, allowing contained latex to coagulate, compressing the article to remove water, washing to remove soluble impurities, drying in vacuum to a subnormal moisture content on heating elements at about 150° F. and compressing the mass into a compact whole while still warm.

18. The process of making rubber and fiber articles which comprises passing fibrous material through a latex bath into an acid bath to produce impregnation, skin coating, and distension, allowing the contained latex to coagulate, compressing the article to remove water, washing to remove soluble impurities, drying to a subnormal moisture content, and compressing the mass thus formed into a compact whole.

In testimony whereof, I have hereunto affixed my signature.

WILLIAM BURTON WESCOTT.